United States Patent
Thawani et al.

(10) Patent No.: US 11,318,808 B2
(45) Date of Patent: May 3, 2022

(54) BLOWER NOISE SUPPRESSOR FOR HVAC SYSTEM

(71) Applicants: DENSO International America, Inc., Southfield, MI (US); DENSO CORPORATION, Kariya (JP)

(72) Inventors: Prakash T. Thawani, Bloomfield Hills, MI (US); Stephen Sinadinos, Commerce Township, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 137 days.

(21) Appl. No.: 16/130,307

(22) Filed: Sep. 13, 2018

(65) Prior Publication Data

US 2020/0086710 A1    Mar. 19, 2020

(51) Int. Cl.
*B60H 1/00* (2006.01)
*G10K 11/16* (2006.01)

(52) U.S. Cl.
CPC ... *B60H 1/00021* (2013.01); *B60H 2001/006* (2013.01); *B60H 2001/00178* (2013.01); *G10K 11/161* (2013.01)

(58) Field of Classification Search
CPC ...... B60H 1/00021; B60H 2001/00178; B60H 2001/006; G10K 11/161; F24F 13/24

(Continued)

(56) References Cited

U.S. PATENT DOCUMENTS 5,521,340 A * 5/1996 Thawani ............ B60H 1/00571
                                                181/227
5,679,073 A    10/1997 Hsieh et al.
(Continued)

FOREIGN PATENT DOCUMENTS

DE   202010016053 U1 * 2/2011 ......... B60H 1/00021
EP       0800030 A1 * 10/1997 ......... B60H 1/00664
(Continued)

OTHER PUBLICATIONS

"Machine Translation of DE202010016053". 2020.*
(Continued)

*Primary Examiner* — Steven B McAllister
*Assistant Examiner* — Elizabeth M. May
(74) *Attorney, Agent, or Firm* — Harness, Dickey & Pierce, P.L.C.

(57) ABSTRACT

A blower unit for a heating, ventilation, and air conditioner system (HVAC) of a vehicle. The blower unit includes an inside/outside air switching box. A switching door disposed in the inside/outside air switching box that is configured to selectively open and close an inside air introduction port and an outside air introduction port of the inside/outside air switching box. A fan is also located inside the inside/outside air switching box and blows air introduced into the inside/outside air switching box from the inside air introduction port and the outside air introduction port into the passenger compartment. A first plurality of ribs is provided on an inner surface of the switching door with a first perforated panel coupled to each of the first plurality of ribs. The first plurality of ribs and the first perforated panel reduce noise generated during an inside air introduction mode.

4 Claims, 6 Drawing Sheets

(58) Field of Classification Search
USPC .......................................................... 454/262
See application file for complete search history.

(56) References Cited

U.S. PATENT DOCUMENTS

| | | |
|---|---|---|
| 5,836,813 A | 11/1998 | Miyata et al. |
| 6,386,966 B1* | 5/2002 | Kuwayama ........ B60H 1/00514 |
| | | 181/225 |
| 2009/0036047 A1 | 2/2009 | Deneau et al. |
| 2019/0186127 A1* | 6/2019 | Hakuta ................. E04B 1/8404 |

FOREIGN PATENT DOCUMENTS

| | | | |
|---|---|---|---|
| JP | S6091503 U | | 6/1985 |
| JP | H9156345 A | | 6/1997 |
| JP | H-09300943 A | * | 11/1997 |
| JP | 200171737 A | | 3/2001 |

OTHER PUBLICATIONS

"Machine Translation of JPH09300943". 2020.*
"Machine Translation of EP0800030A1". 2020.*
Bravo et al. (NPL: "Vibroacoustic properties of thin micro-perforated panel absorbers", Published Online: Aug. 8, 2012, URL: https://asa.scitation.org/doi/10.1121/1.4733555) (Year: 2012).*

* cited by examiner

BLOWER NOISE SUPPRESSOR FOR HVAC SYSTEM

FIELD

The present disclosure relates to a blower noise suppressor for a heating, ventilating, and air conditioning (HVAC) system.

BACKGROUND

This section provides background information related to the present disclosure and is not necessarily prior art.

Vehicles, such as automobiles, include climate control systems or heating, ventilating and air conditioning (HVAC) systems that function to heat, ventilate and cool a cabin or passenger compartment of a vehicle and battery systems in electric vehicles. An HVAC system includes a blower unit, an evaporator, and a heater core. The blower unit includes a blower mounted on a motor, an outside air introduction port, an inside air introduction port, and an inside/outside switching door.

Air drawn in from the inside air introduction port or outside air introduction port may be subsequently heated, with the heater core, or cooled, with the evaporator, and discharged into the passenger compartment through one or more of a plurality of ducts and vents. Operation of the HVAC system may generate noise, which may adversely affect vehicle occupants' comfort and enjoyment of the vehicle.

The present disclosure provides an HVAC system that may reduce noise audible in the passenger compartment while improving or maintaining airflow characteristics and/or other operating conditions throughout the system.

SUMMARY

This section provides a general summary of the disclosure and is not a comprehensive disclosure of its full scope or all of its features.

In a feature, a blower unit for a heating, ventilation, and air conditioner system (HVAC) of a vehicle is described. The blower unit includes an inside/outside air switching box, a switching door, a fan, a first plurality of ribs, and a first perforated panel. The inside/outside air switching box having an inside air introduction port through which air from inside a passenger compartment is introduced to the inside/outside air switching box, and an outside air introduction port through which air from outside the passenger compartment is introduced to the inside/outside air switching box. The switching door is disposed in the inside/outside air switching box and configured to selectively open and close the inside air introduction port and the outside air introduction port. The fan is disposed at a downstream air side of the inside/outside air switching box and configured to blow air introduced to the inside/outside air switching box from the inside air introduction port and the outside air introduction port into the passenger compartment. The first plurality of ribs are provided on an inner surface of the switching door. The first perforated panel is coupled to each of the first plurality of ribs. The first plurality of ribs and the first perforated panel reduce noise generated during an inside air introduction mode. During the inside air introduction mode, air from inside the passenger compartment is introduced to the inside/outside air switching box.

In further features, the first plurality of ribs includes a first rib, a second rib, and a third rib.

In further features, the first rib is positioned at a first distance from the second rib. The second rib is positioned at a second distance from the third rib. The second rib is positioned between the first rib and the third rib, and the first distance and the second distance are different distances.

In further features, the first distance is greater than the second distance.

In further features, the first distance and the second distance are based on a frequency of a target tone to be suppressed.

In further features, each of the first plurality of ribs includes a top end and a bottom end; the top end is opposite the bottom end. The top end is located further from the switching door than the bottom end. The perforated panel is coupled to the top end of each of the first plurality of ribs.

In further features, the first perforated panel extends from the first rib to the third rib.

In further features, the first perforated panel extends an entire length of the switching door.

In further features, a second plurality of ribs provided on an outer surface of the switching door. A second perforated panel is coupled to the second plurality of ribs. The second plurality of ribs and the second perforated panel reduce noise generated during an outside air introduction mode. During the outside air introduction mode, air from outside the passenger compartment is introduced to the inside/outside air switching box. The second plurality of ribs includes a fourth rib, a fifth rib, and a sixth rib. The fourth rib is positioned at a third distance from the fifth rib, the fifth rib is positioned at a fourth distance from the sixth rib. The fifth rib is positioned between the fourth rib and the sixth rib. The third distance and the fourth distance are different distances.

In further features, the first plurality of ribs protrudes from the inner surface of the switching door toward an inner side of the inside/outside air switching box during the inside air introduction mode. Top ends of each of the first plurality of ribs are disposed along a main flow of air from the inside air introduction port during the inside air introduction mode. The top ends of each of the first plurality of ribs are positioned on a line that is approximately parallel to the main flow of air flowing from the inside air introduction port during the inside air introduction mode.

The blower unit includes an inside/outside air switching box, a switching door, a fan, and a first plurality of ribs. The inside/outside air switching box having an inside air introduction port through which air from inside a passenger compartment is introduced to the inside/outside air switching box, and an outside air introduction port through which air from outside the passenger compartment is introduced to the inside/outside air switching box. The switching door is disposed in the inside/outside air switching box and configured to selectively open and close the inside air introduction port and the outside air introduction port. The fan is disposed at a downstream air side of the inside/outside air switching box configured to blow air introduced to the inside/outside air switching box from the inside air introduction port and the outside air introduction port into the passenger compartment. The first plurality of ribs provided on an inner surface of the switching door. The first plurality of ribs include a first rib, a second rib, and a third rib. During an inside air introduction mode, air from inside the passenger compartment is introduced to the inside/outside air switching box. The first plurality of ribs reduces generated during the inside air introduction mode. The first rib is positioned at a first distance from the second rib. The second rib is positioned at a second distance from the third rib. The second rib is positioned between the first rib and the third rib; and the first distance and the second distance are different distances.

In further features, the first distance is greater than the second distance.

In further features, the blower unit includes a first perforated panel. The switching door has a circular arc shape. The first perforated panel is connected between a first end of the switching door and a second end of the switching door.

In further features, the first distance and the second distance are based on a frequency of a target tone to be suppressed.

In further features, the blower unit includes a second plurality of ribs that are provided on an outer surface of the switching door that reduce noise generated during the outside air introduction mode. During an outside air introduction mode, air from outside the passenger compartment is introduced to the inside/outside air switching box.

In further features, the second plurality of ribs includes a fourth rib, a fifth rib, and a sixth rib. The fourth rib is positioned at a third distance from the fifth rib. The fifth rib is positioned at a fourth distance from the sixth rib. The fifth rib is positioned between the fourth rib and the sixth rib. The third distance and the fourth distance are different distances.

In further features, the blower unit includes a first perforated panel and a second perforated panel. The first perforated panel is coupled to each of the first plurality of ribs and reduces noise generated during the inside air introduction mode. The second perforated panel is coupled to each of the second plurality of ribs and reduces noise generated during the outside air introduction mode.

In further features, a height of each of the first plurality of ribs is equal to a height of each of the second plurality of ribs.

In further features, the first perforated panel extends from the first rib to the third rib. The second perforated panel extends from the fourth rib to the sixth rib.

In further features, top ends of each of the first plurality of ribs are disposed along a main flow of air from the inside air introduction port during the inside air introduction mode. The top ends of each of the first plurality of ribs are positioned on a line that is approximately parallel to the main flow of air flowing from the inside air introduction port during the inside air introduction mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
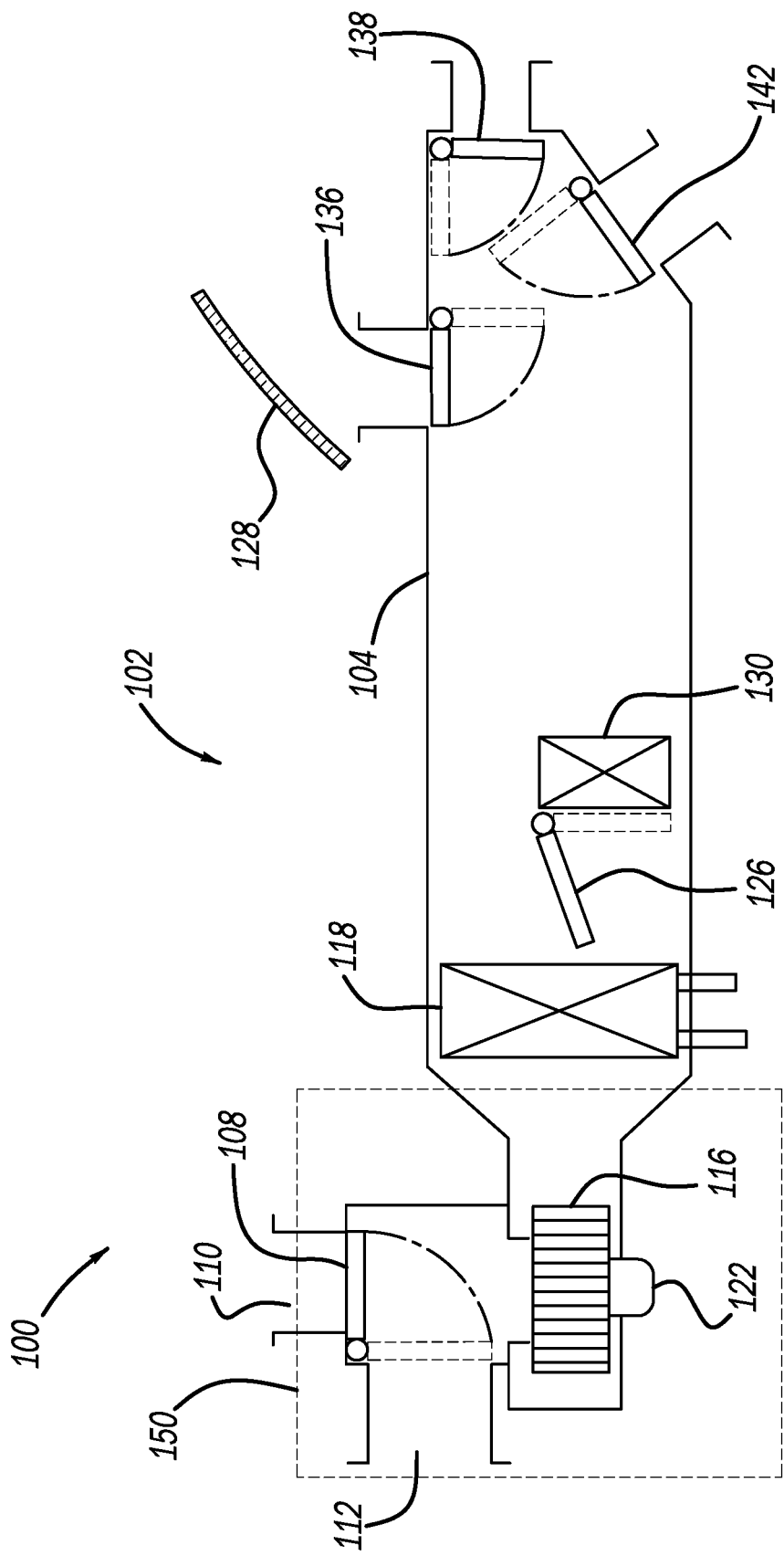
FIG. 1 is a schematic diagram of a vehicle heating, ventilation, and air conditioning (HVAC) system according to the present teachings.

With initial reference to FIG. 1, a vehicle heating, ventilation, and air conditioning (HVAC) system 100 is shown. The air conditioning system 100 includes an air conditioning unit 102, which has an air conditioning case 104 and is located within a dashboard panel.

The air conditioning case 104 includes a blower unit 150. The blower unit 150 includes an inside/outside (recirculated/fresh) switching door 108, an outside air introduction port 110, and a first inside air introduction port 112. The inside/outside (recirculated/fresh) switching door 108 is switched to a first position (indicated by a solid line in FIG. 1) to introduce air inside of the vehicle (inside air) into the air conditioning case 104 through the first inside air introduction port 112. The inside/outside (recirculated/fresh) switching door 108 is switched to a second position (indicated by a broken line in FIG. 1) to introduce air from outside of the vehicle (outdoor air) into the air conditioning case 104 through the outside air introduction port 110. While not specifically shown in FIG. 1, a second inside air introduction port may be included.

A blower fan 116 draws the outside air from the outside air introduction port 110 or the inside air from the first inside air introduction port 112 as an air stream to an evaporator 118 in accordance with the rotational speed of a driving motor 122 of the blower fan 116. The evaporator 118 cools the air stream drawn in from the blower fan 116 with refrigerant, which is circulated by actuation of a well-known refrigeration cycle.

An air mix door 126 distributes the cooled air stream from the evaporator 118 into a first cooled air stream and a second cooled air stream. The first cooled air stream flows into a heater core 130 and the second cooled air stream bypasses the heater core 130. The first cooled air stream is heated in the heater core 130 by cooling water (hot water) from a vehicle's engine, and thus hot air is blown out from the heater core 130 or other heat generating device such as a positive temperature coefficient (PTC) heater in electric vehicles. The hot air from the heater core 130 and the second cooled air stream, which bypassed the heater core 130, are mixed and flow to discharge port doors 136, 138, and 142. For example, discharge port door 136 may direct hot air from the heater core 130 at a windshield 128 of a vehicle. The mixture ratio SW (%) of the hot air and cooled air is determined by an opening degree of the air mix door 126.

The inside/outside (recirculated/fresh) switching door 108 may include a plurality of ribs that are provided to the inside/outside (recirculated/fresh) switching door 108 in order to achieve certain performance parameters like temperature stratification and directing or guiding the airflow. For example, the plurality of ribs may guide the flow of air from the first inside air introduction port 112 toward the blower fan 116 so that airflow is more uniform. However, the plurality of ribs may induce or excite turbulence and induce objectionable noises or tones in the cabin caused by vortex shedding. For example, when high velocity airflow comes from the first inside air introduction port 112 and the airflow separates from the surface of the plurality of ribs. The separation of the boundary layer from the surface of the plurality of the ribs results in vortex shedding broadband noises and/or tones.

Figure 2:
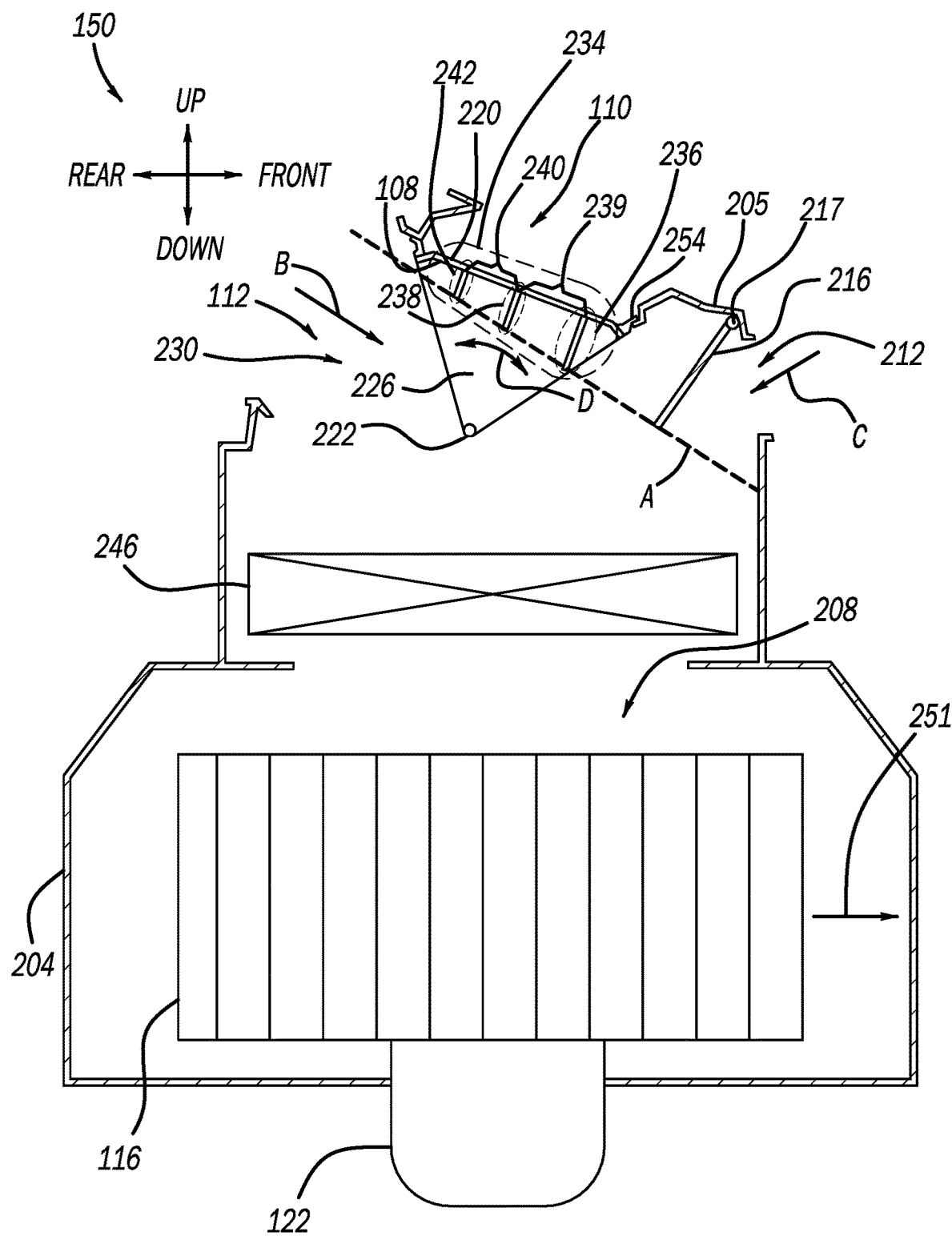
FIG. 2 is a sectional view of a blower unit including an inside/outside (recirculated/fresh) switching door with a plurality of ribs, according to the present teachings.

With reference to FIG. 2, the blower unit 150 is shown. The blower unit 150 is disposed in a vehicle to correspond to the arrangement direction of FIG. 2 in an up-down direction and in a front-rear direction. The blower unit 150 includes an inside/outside air switching box (case) 205 made of plastic and a scroll casing 204 adjacently disposed under the inside/outside air switching box 205. The inside/outside air switching box 205 is connected to the scroll casing 204 so that an interior of the inside/outside air switching box 205 communicates with a suction port 208 of the scroll casing 204.

The inside/outside air switching box 205 includes the first inside air introduction port 112 and may include a second inside air introduction port 212 for introducing air inside the passenger compartment. The inside/outside air switching box 205 also includes the outside air introduction port 110 for introducing air outside the passenger compartment. In the vehicle front-rear direction, the first inside air introduction port 112 is provided at a rearmost side, the second inside air introduction port 212 is provided at a frontmost side and the outside air introduction port 110 is provided between the first inside air introduction port 112 and the second inside air introduction port 212. The second inside air introduction port 212 has an opening area smaller than that of the first inside air introduction port 112 and is used for secondary airflow "C". Lattice members (not shown) for preventing accidental ingestion of small objects or tissue paper from the passenger compartment into the first inside air introduction port 112 and the second inside air introduction port 212 are disposed within each respective port.

The inside/outside (recirculated/fresh) switching door 108 includes an outer surface 220 extending in a door rotation direction (circumferential direction) "D", a rotation shaft 222, and side plates 226 through which the rotation shaft 222 is coupled with both side ends of the outer surface 220 in an axial direction of the rotation shaft 222. A dimension of a door base portion constructed by the outer surface 220 and the side plates 226 are set to open and close the first inside air introduction port 112 and the outside air introduction port 110.

Figure 6:
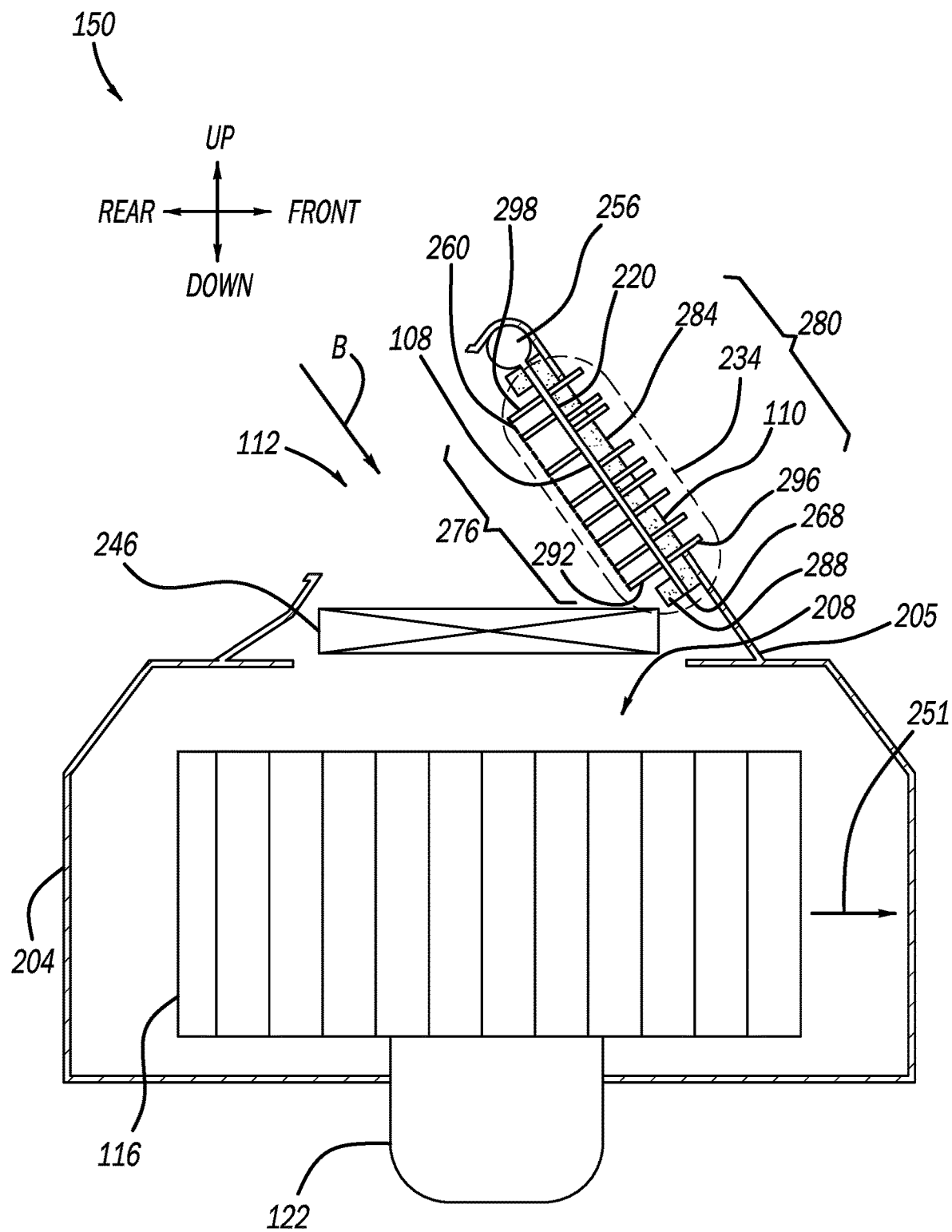
FIG. 6 is a sectional view of a blower unit including an inside/outside (recirculated/fresh) switching door with a first plurality of ribs, a second plurality of ribs, and a micro perforated panel (MPP), according to the present teachings.

The first inside air introduction port 112 has an opening portion placed at a vehicle rear side surface of the inside/outside air switching box 205, and an opening 230 placed at both side surfaces of the inside/outside air switching box 205 in a vehicle right-left direction. Therefore, the first inside air introduction port 112 has an opening shape defined by a position opposing the outer surface 220 of the inside/outside (recirculated/fresh) switching door 108 to a position opposing the side plates 226 during the inside air introduction mode. Accordingly, an opening area of the first inside air introduction port 112 is increased and maximum cooling capacity during an inside air introduction mode is improved. On the other hand, the outside air introduction port 110 and the second inside air introduction port 212 generally have rectangular flat shapes, respectively. The inside/outside (recirculated/fresh) switching door 108 described above is referred to as a rotary door throughout this disclosure. However, the inside/outside air switching door may also have another suitable configuration such as a plate-like configuration as shown in FIG. 6. In the plate-like configuration, the inside/outside (recirculated/fresh) switching door 108 rotates around a hinge portion and side plates 226 and the rotation shaft 222 are omitted.

The inside/outside air switching box includes a second inside air door 216. The second inside air door 216 has a plate-like door that rotates around a hinge portion 217 to open and close the second inside air introduction port 212. The rotation shaft 222 protrudes from rotation center positions of the side plates 226 to axial outer sides so that both ends of the rotation shaft 222 are rotatably held in bearing holes (not shown) of the inside/outside air switching box 205. One side end of the rotation shaft 222 of the inside/outside (recirculated/fresh) switching door 108 and an operation part (not shown) of the second inside air door 216 are connected to a door operation mechanism (not shown) in an outer side of the inside/outside air switching box 205. Therefore, the inside/outside (recirculated/fresh) switching door 108 and the second inside air door 216 are operatively linked to each other.

An inner space of the inside/outside (recirculated/fresh) switching door 108, defined by the outer surface 220 and the side plates 226, is directly opened to an outside. Therefore, air can freely pass through the inside/outside (recirculated/fresh) switching door 108 in the vehicle front-rear direction. The inside/outside (recirculated/fresh) switching door 108 further includes a plurality of ribs 234.

The plurality of ribs 234 are disposed to protrude from an inner surface of the inside/outside (recirculated/fresh) switching door 108 toward the rotation shaft 222. The plurality of ribs 234 are flat-like protrusion plates that may be integrally formed with the inside/outside (recirculated/fresh) switching door 108. The plurality of ribs 234 protrude in a direction crossing with the door axial direction.

During inside air introduction mode, airflow and corresponding incident wave (i.e., the sound wave) generated by the airflow passing into and out of the spaces defined between by the plurality of ribs 234 generates a reflected wave that is the same frequency and amplitude of the incident wave of a target tone to be suppressed but that is 180 degrees out of phase from the incident wave. The reflected wave and the incident wave effectively cancel each other out under ideal circumstances (achieving full phase cancellation or full destructive interference) or reduce the amplitude of the incident wave considerably.

In FIG. 2, the plurality of ribs 234 includes at least a first rib 236, a second rib 238, and a third rib 242. The first rib 236 and the second rib 238 are positioned at a first distance 239 from each other. The second rib 238 and the third rib 242 are positioned at a second distance 240 from each other. The first distance 239 and the second distance 240 are different distances. For example, the first distance 239 may be double the second distance 240 or another suitable ratio. The first distance 239 and the second distance 240 may be set to attenuate a frequency of a target tone. For example, by increasing the first distance 239 between the first rib 236 and the second rib 238, a lower frequency target tone may be suppressed. By decreasing the first distance 239, a higher frequency target tone may be suppressed. Thus, after one or more target tones to be suppressed are identified, the spacing between each of the plurality of ribs 234 may be determined.

During an inside air introduction mode shown in FIG. 2, inside air flows from the first inside air introduction port 112 into an inlet surface of an air filter 246 along a main flow shown by arrow B. A connection line A is set to be approximately parallel to the main flow B of the inside air from the first inside air introduction port 112. The top ends of each of the plurality of ribs 234 are positioned approximately on the connection line A.

The height of the second inside air door 216 is set so that a top end of the second inside air door 216 is positioned approximately on the connection line A during inside air introduction mode. Accordingly, during the inside air introduction mode, the top ends of each of the plurality of ribs 234 and the second inside air door 216 are substantially parallel to the main flow B of inside air flowing from the first inside air introduction port 112. In the air filter 246 of FIG. 1, a filter member formed by a corrugated paper or a porous polyurethane foam is supported by a resinous frame. The air filter 246 is for removing dust contained in air and has a flat plate shape. However, in the air filter 246, an adsorbent such as activated carbon for removing smell composition may be added in the filter member so that a deodorizing function can be obtained.

The scroll casing 204 is made of resin and may have the suction port 208 at a position immediately downstream from the air filter 246. Although not specifically shown, the suction port may be a bell-mouth like suction port. The blower fan 116 is disposed at a center position of a scroll-shaped inner space of the scroll casing 204, so that air sucked from the suction port 208 is blown toward a radial direction 251. The blower fan 116 is connected to a rotation shaft of the driving motor 122. An air outlet (not shown) of the scroll casing 204 is connected to an air conditioning unit (not shown) of the vehicle air conditioner. The air conditioning unit is for adjusting air state to be blown into the passenger compartment. The air state is adjusted in the air conditioning unit by cooling, defrosting, heating and the like.

Next, operation of the blower unit 150 for the vehicle air conditioner according to FIG. 2 is described. A switching operation of the inside/outside air introduction is performed by the inside/outside (recirculated/fresh) switching door 108 and the second inside air door 216. During the inside air introduction mode, the top ends of the elastic seal members 254 of the inside/outside (recirculated/fresh) switching door 108 are elastically pressed to the tilt seal surfaces of the protrusion portions so that the outside air introduction port 110 is fully closed and the first inside air introduction port 112 is fully opened. At this time, the second inside air door 216 is positioned at the solid line position in FIG. 2 to fully open the second inside air introduction port 212. Thus, during the inside air introduction mode, inside air is introduced from both the first inside air introduction port 112 and the second inside air introduction port 212.

When the outside air introduction mode is set, the inside/outside (recirculated/fresh) switching door 108 is rotated by a predetermined angle in a counterclockwise direction. Therefore, during the outside air introduction mode, the top ends of the elastic seal members 254 of the inside/outside (recirculated/fresh) switching door 108 are elastically pressed to the tilt seal surfaces of the protrusion portions so that the outside air introduction port 110 is fully opened and the first inside air introduction port 112 is fully closed. At the same time, the top ends of the elastic seal members (not shown) of the side plates 226 are elastically pressed to the tilt seal surfaces of protrusions of the inside/outside air switching box 205. As a result, during the outside air introduction mode, both the openings 230 of the first inside air introduction port 112 are closed by the outer surface 220 and the side plates 226 of the inside/outside (recirculated/fresh) switching door 108, and the outside air introduction port 110 is fully opened.

Since the top ends of each of the plurality of ribs 234 and the second inside air door 216 are arranged to be approximately parallel to the main flow B during inside air introduction mode, the main flow B of inside air is not disturbed. Accordingly, it can prevent flow disturbance noise due to a disturbance of the main flow B of inside air from being generated.

Since each of the plurality of ribs 234 has a different height and the first distance and the second distance are different from each other, a volume of space, defined by the inside/outside (recirculated/fresh) switching door 108 and each of the plurality of ribs 234 is different. Therefore, air-blowing noises or tones can be effectively reduced in a broad range of frequency. As a result, a noise level transmitted from the first inside air introduction port 112 into the passenger compartment, during the inside air introduction mode, can be effectively reduced.

Figure 3:
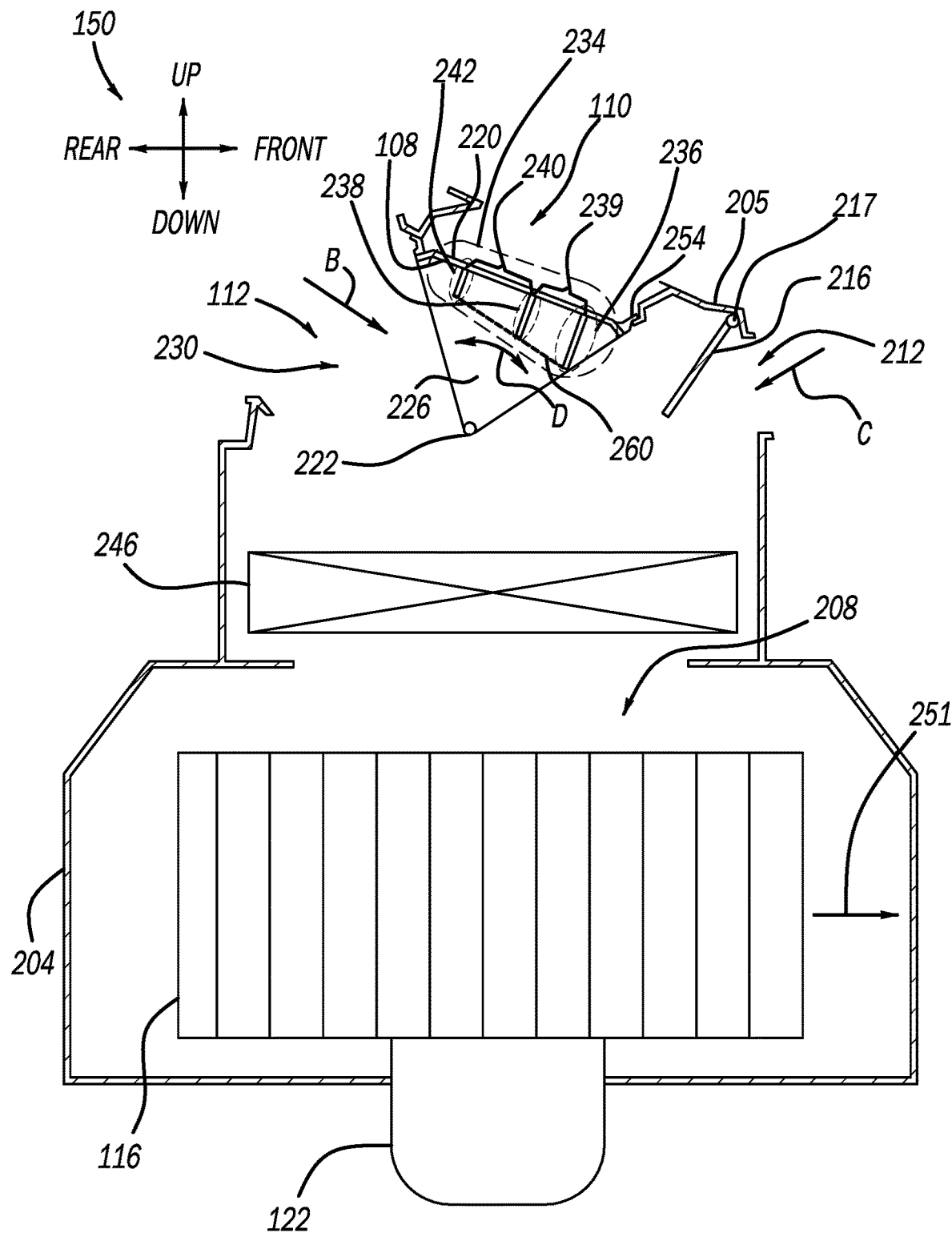
FIG. 3 is a sectional view of a blower unit including an inside/outside (recirculated/fresh) switching door with a plurality of ribs and a micro perforated panel (MPP), according to the present teachings.

With reference to FIG. 3, the blower unit configuration of FIG. 2 is shown with the addition of an MPP 260. The plurality of ribs 234 may induce or excite turbulence and induce objectionable noises or tones to the cabin caused by vortex shedding. For example, when high velocity airflow comes from the first inside air introduction port 112, when the airflow separates from the surface of the plurality of ribs 234. The separation of boundary layer from the surface of the plurality of ribs 234 results in vortex shedding noises or tones. By adding the MPP 260 to the plurality of ribs 234, vortex shedding noises may be reduced considerably.

Figure 4A:
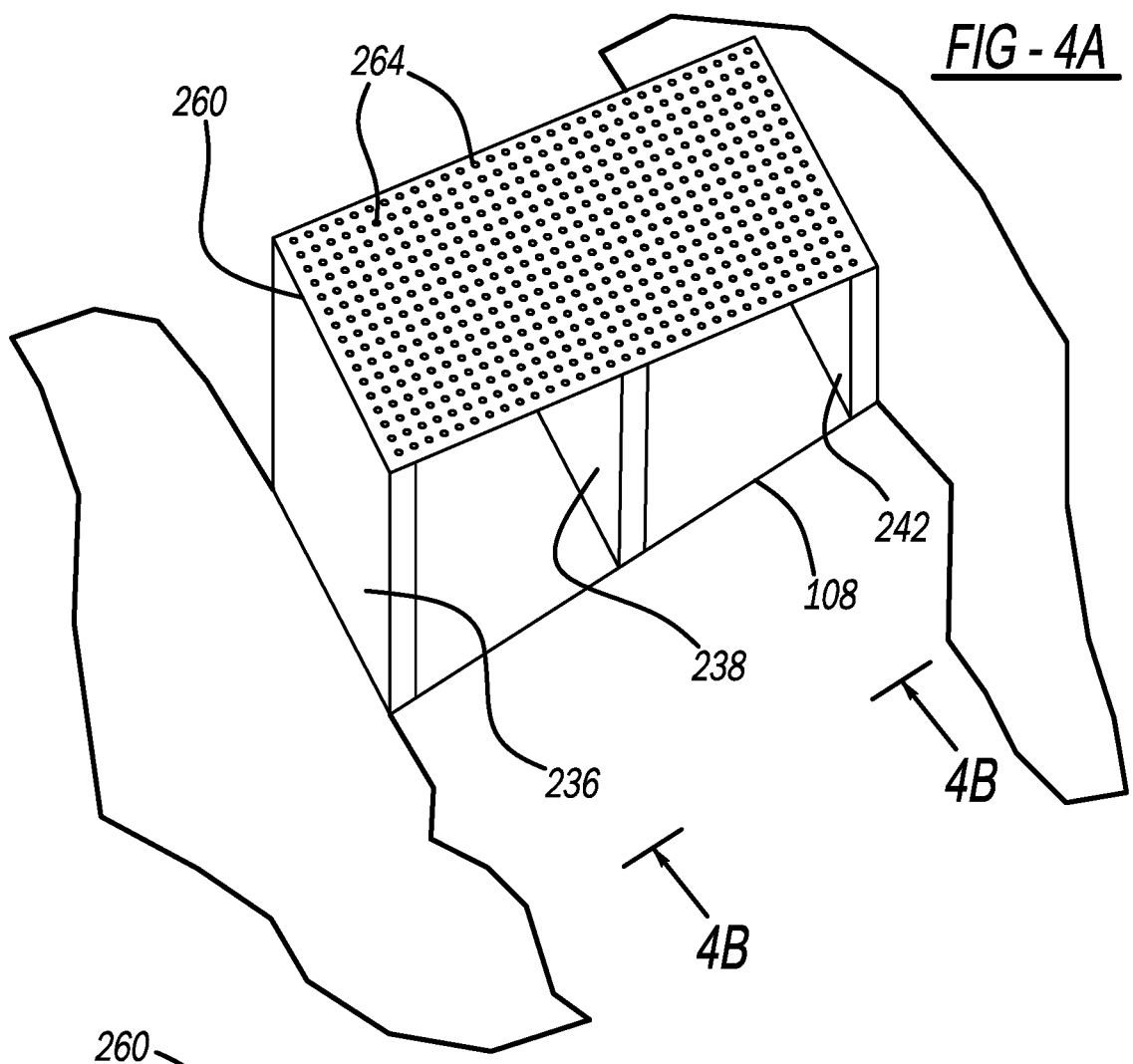
FIG. 4A is an isometric view of a cut portion of the inside/outside (recirculated/fresh) switching door including a plurality of ribs and a micro perforated panel (MPP), according to the present teachings.

With reference to FIG. 4A, an isometric view of a cut portion of the inside/outside (recirculated/fresh) switching door 108 is shown. The inside/outside (recirculated/fresh) switching door 108 is shown with the side plates 226 removed. The MPP 260 includes a plurality of openings 264. The plurality of openings 264 may have any suitable shape and size. For example, the MPP 260 may have a porosity of 3%-10% of the open surface area. While the range of 3-10% is provided, the MPP 260 may have any suitable porosity. The exact porosity and dimensions of the MPP 260 may be based on a frequency of a target tone or noise to be suppressed.

Figure 4B:
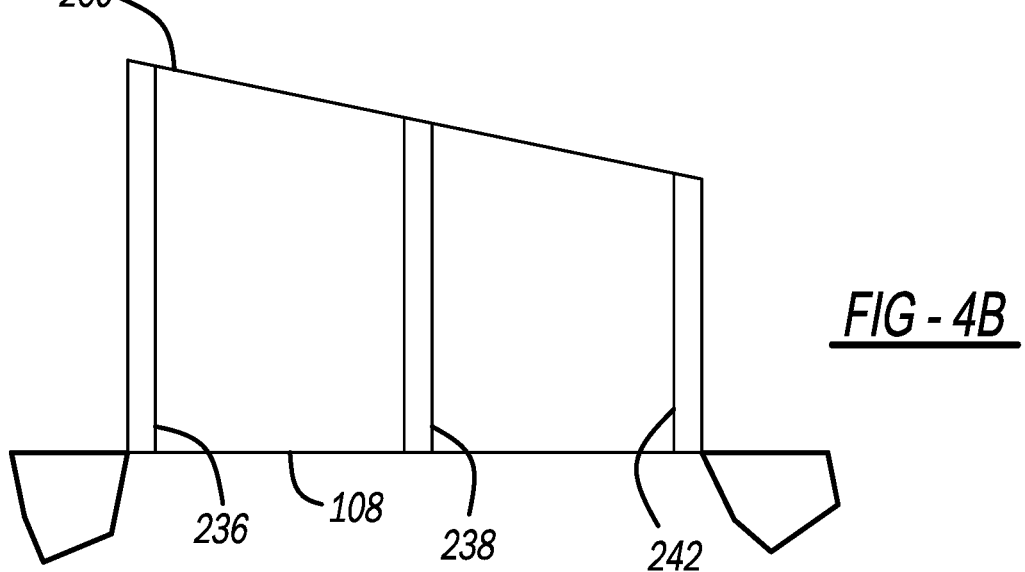
FIG. 4B is a side view of a cut portion of the inside/outside (recirculated/fresh) switching door including a plurality of ribs and a micro perforated panel (MPP) according to the present teachings.

With reference to FIG. 4B, a side view of a cut portion of the inside/outside (recirculated/fresh) switching door 108 is shown. The MPP 260 can be secured to the plurality of ribs 234 in any suitable manner, such as with any suitable adhesive and/or with any suitable mechanical fastening, such as a snap-fit. The dimensions of the MPP 260 are dependent on the size of the inside/outside (recirculated/fresh) switching door 108. In FIG. 3, the MPP 260 extends between the first rib 236 and the third rib 242 and is connected to the first rib 236, the second rib 238, and the third rib 242. However, the MPP 260 may extend past the first rib 236 and/or the third rib 242. For example, the MPP 260 may have a length equal to the length of the inside/outside (recirculated/fresh) switching door 108.

Figure 5:
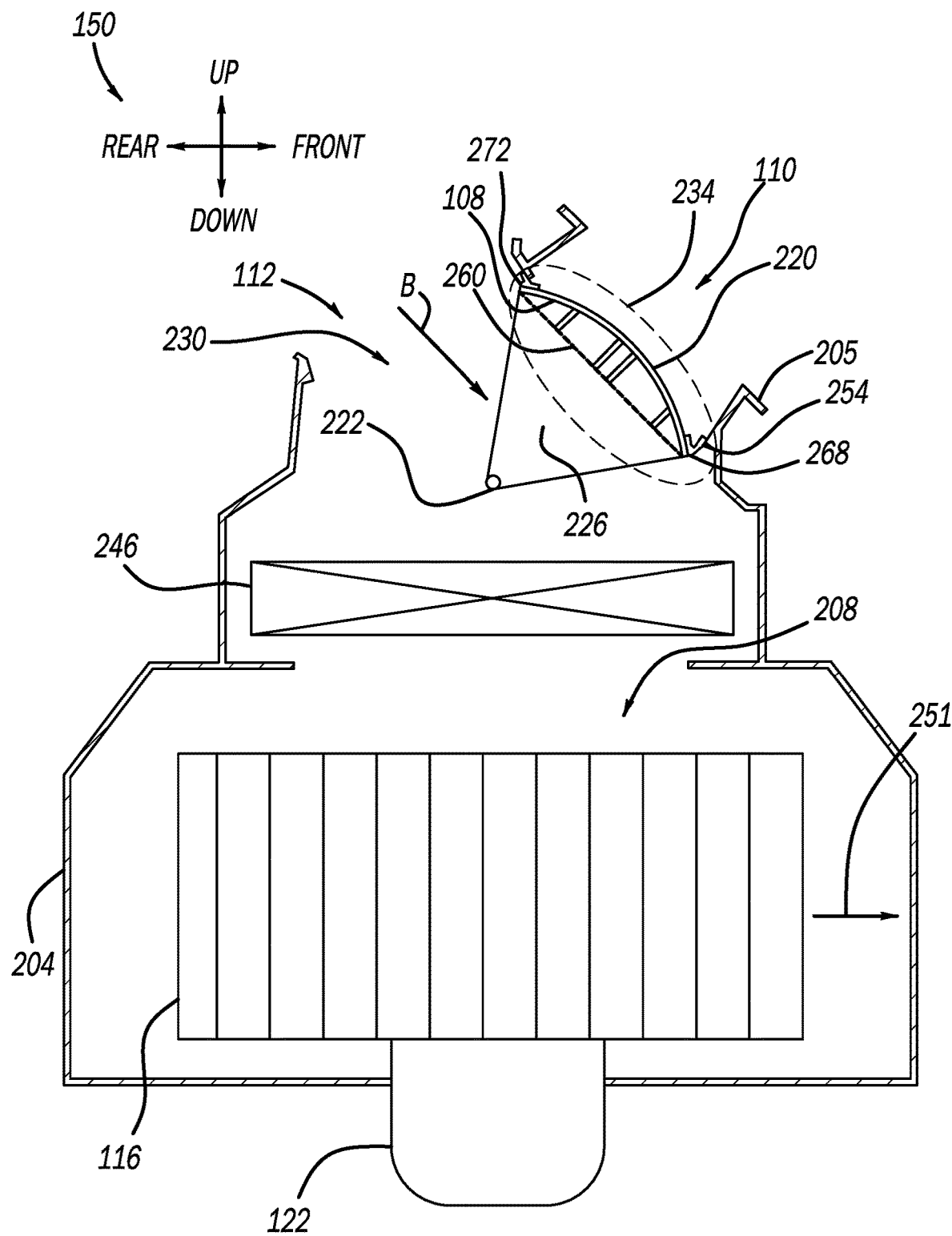
FIG. 5 is a sectional view of a blower unit including an inside/outside (recirculated/fresh) switching door with a plurality of ribs and a micro perforated panel (MPP), according to the present teachings.

With reference to FIG. 5, the outer surface 220 is formed into a circular arc shape having a curvature radius with a rotation center of the rotation shaft 222 as opposed to the flat shape of the outer surface 220 in FIG. 2. The MPP 260 is also included. A second inside air introduction port and a second inside air door described in FIG. 2 are omitted.

The MPP 260 extends from a first end 268 of the inside/outside (recirculated/fresh) switching door 108 to a second end 272 of the inside/outside (recirculated/fresh) switching door 108. The MPP 260 is connected at the first end 268 of the inside/outside (recirculated/fresh) switching door 108 and also connected at the second end 272 of the inside/outside (recirculated/fresh) switching door 108. The positions of the top ends of each the plurality of ribs 234 are disposed along the main flow B of the inside air during inside air introduction mode. Therefore, an effect similar to that of the first embodiment can be achieved even with the outer wall being formed into a circular arc.

With reference to FIG. 6, the inside/outside (recirculated/fresh) switching door 108 is shown with a plate-like door instead of a rotary door as described previously. In FIG. 6 the first inside air introduction port 112 is open and the outside air introduction port 110 is closed, corresponding to the inside air introduction mode. A hinge 256 allows rotation of the door from the outside air introduction port 110 to the first inside air introduction port 112. The plurality of ribs 234 includes a first plurality of ribs 276 and a second plurality of ribs 280 included on both sides of the inside/outside (recirculated/fresh) switching door 108. The MPP 260 is also included with the first plurality of ribs 276. A second inside air introduction port and a second inside air door are omitted.

A plate-like elastic seal member 284 made of a packing material such as a porous foaming material is bonded to the entire outer surface 220 of the inside/outside (recirculated/fresh) switching door 108. On the other hand, a rectangular elastic seal member 288 made of a packing material such as a porous foaming material is bonded to the inner surface of the inside/outside (recirculated/fresh) switching door 108 only at a position corresponding to an opening peripheral part of the first inside air introduction port 112. The outside air introduction port 110 and the first inside air introduction port 112 have a flat opening.

The first plurality of ribs 276 are positioned at different distances from each other on the inside/outside (recirculated/fresh) switching door 108. During the inside air introduction mode, the first plurality of ribs 276 protrude from an inner surface of the inside of the inside/outside (recirculated/fresh) switching door 108 toward the air filter 246. During the outside air introduction mode, the second plurality of ribs 280 protrude from the outer surface 220 of the inside/outside (recirculated/fresh) switching door 108 toward the air filter 246. The second plurality of ribs 280 are positioned at different distances from each other.

In FIG. 6, some of the first plurality of ribs 276 and some of the second plurality of ribs 280 are shown positioned at different positions on the inside/outside (recirculated/fresh) switching door 108; however, the first plurality of ribs 276 and the second plurality of ribs 280 may be positioned at the same relative position, respective to the length of the inside/outside (recirculated/fresh) switching door 108, just on the opposite side of the inside/outside (recirculated/fresh) switching door 108. For example, a first rib 292 of the first plurality of ribs 276 may be positioned at the same distance from the first end 268 of the inside/outside (recirculated/fresh) switching door 108 as a first rib 296 of the second plurality of ribs 280. The positions of top ends of the first plurality of ribs 276 are set to be arranged along the main flow B of inside air during inside air introduction mode. Therefore, the effect similar to that of configurations discussed in FIGS. 2-5 can be achieved.

The MPP 260 on the inside of the inside/outside (recirculated/fresh) switching door 108 is shown as connected between the first rib 292 of the first plurality of ribs 276 and a last rib 298 of the first plurality of ribs 276. The MPP 260 may also be connected between the plate-like elastic seal member 284 or in any other suitable manner. Although not specifically shown, a second MPP may also be connected to the second plurality of ribs 280 and may have the same or different dimensions than the MPP 260 connected to the first plurality of ribs 276.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A blower unit for a heating, ventilation, and air conditioner system (HVAC) of a vehicle, comprising:
    an inside/outside air switching box having an inside air introduction port through which air from inside a passenger compartment is introduced to the inside/outside air switching box, and an outside air introduction port through which air from outside the passenger compartment is introduced to the inside/outside air switching box;
    a switching door disposed in the inside/outside air switching box configured to open the inside air introduction port and close the outside air introduction port during an inside air introduction mode and to close the inside air introduction port and open the outside air introduction port during an outside air introduction mode;
    a fan disposed at a downstream air side of the inside/outside air switching box configured to blow air introduced to the inside/outside air switching box from the inside air introduction port during the inside air introduction mode and from the outside air introduction port during the outside air introduction mode into the passenger compartment;
    a plurality of ribs, each rib having a first end and a second end opposite to the first end, the first ends of the plurality of ribs being connected to an inner surface of the switching door and the plurality of ribs having heights such that the second ends of the plurality of ribs form a connection line that is parallel to a main flow of air flowing from the inside air introduction port during the inside air introduction mode; and
    a micro perforated panel that is coupled to the second ends of the plurality of ribs,
    wherein:
        the plurality of ribs and the micro perforated panel reduce noise, including a target tone to be suppressed, generated during the inside air introduction mode,
        a porosity of the micro perforated panel is between three percent and ten percent and selected to suppress a frequency of the target tone to be suppressed,
        the plurality of ribs includes a first rib, a second rib, and a third rib, with the first rib being positioned at a first distance from the second rib and the second rib being positioned at a second distance from the third rib, the first distance being different from the second distance, and the first and second distances being selected to suppress the frequency of the target tone to be suppressed, and
        during the inside air introduction mode, air from inside the passenger compartment is introduced to the inside/outside air switching box.

2. The blower unit according to claim 1 wherein:
    the second rib is positioned between the first rib and the third rib.

3. The blower unit according to claim 2 wherein the first distance is greater than the second distance.

4. The blower unit according to claim 2 wherein the micro perforated panel extends an entire length of the switching door.

\* \* \* \* \*